US011327510B2

(12) United States Patent
Smirnov

(10) Patent No.: US 11,327,510 B2
(45) Date of Patent: May 10, 2022

(54) MULTI-CHAMBER RATE-OF-CHANGE SYSTEM FOR GAS FLOW VERIFICATION

(71) Applicant: Hitachi Metals, Ltd., Tokyo (JP)

(72) Inventor: Alexei V. Smirnov, Fort Collins, CO (US)

(73) Assignee: Hitachi Metals, Ltd., Tokyo (JP)

( * ) Notice: Subject to any disclaimer, the term of this patent is extended or adjusted under 35 U.S.C. 154(b) by 358 days.

(21) Appl. No.: 16/395,723

(22) Filed: Apr. 26, 2019

(65) Prior Publication Data

US 2019/0361468 A1 Nov. 28, 2019

Related U.S. Application Data

(60) Provisional application No. 62/675,529, filed on May 23, 2018.

(51) Int. Cl.
| | |
|---|---|
| G05D 7/06 | (2006.01) |
| G01F 1/34 | (2006.01) |
| G01F 25/10 | (2022.01) |
| G01F 25/17 | (2022.01) |
| G01F 15/04 | (2006.01) |
| G01F 1/684 | (2006.01) |

(52) U.S. Cl.
CPC ............ *G05D 7/0617* (2013.01); *G01F 1/34* (2013.01); *G01F 1/6847* (2013.01); *G01F 15/043* (2013.01); *G01F 25/10* (2022.01); *G01F 25/17* (2022.01); *B01J 2219/00164* (2013.01)

(58) Field of Classification Search
CPC ... G01F 1/34; G01F 1/36; G01F 1/363; G01F 1/366; G01F 1/37; G01F 1/372; G01F 1/375; G01F 1/377; G01F 1/38; G01F 1/383; G01F 1/386; G01F 1/40; G01F 1/42; G01F 1/44; G01F 1/46; G01F 1/48; G01F 1/50; G01F 5/005; G01F 22/02; G01F 25/0007; G01F 25/0038
See application file for complete search history.

(56) References Cited

U.S. PATENT DOCUMENTS

| | | | | |
|---|---|---|---|---|
| 5,865,205 A | * | 2/1999 | Wilmer | ............... G05D 7/0635 137/2 |
| 7,412,986 B2 | | 8/2008 | Tison et al. | |

(Continued)

FOREIGN PATENT DOCUMENTS

JP  1990-065124  5/1990

OTHER PUBLICATIONS

Kumondai, Kosuke, "International Search Report Regarding PCT/JP2019/019638", dated Jun. 3, 2019, p. 9, Published in: JP.

*Primary Examiner* — Herbert K Roberts
(74) *Attorney, Agent, or Firm* — Neugeboren O'Dowd PC

(57) ABSTRACT

A multi-chamber rate-of-change flow meter system and methods for operating the same are disclosed. The multi-chamber rate-of-change flow meter system includes a collection of N chambers, means for drawing a gas into or out of the collection of N chambers, N pressure sensors corresponding one of the N chambers, and means for redistributing the gas among the chambers. A measurement module is coupled to the pressure sensors to obtain a rate of change of pressure in each of the chambers due to the redistribution of the gas and calculate a flow rate of the gas flowing into or out of the collection of N chambers based upon the rate of change of pressure in each of the chambers.

12 Claims, 13 Drawing Sheets

(56) References Cited

U.S. PATENT DOCUMENTS

| | | |
|---|---|---|
| 7,424,895 B2 | 9/2008 | Tison et al. |
| 7,461,549 B1 * | 12/2008 | Ding .................... G01F 3/36 |
| | | 73/239 |
| 7,474,968 B2 | 1/2009 | Ding et al. |
| 7,823,436 B2 | 11/2010 | Monkowski et al. |
| 7,891,228 B2 | 2/2011 | Ding et al. |
| 8,074,677 B2 * | 12/2011 | Gold ................. H01J 37/32449 |
| | | 137/487.5 |
| 2009/0183548 A1 * | 7/2009 | Monkowski ........ G01F 25/0038 |
| | | 73/1.35 |
| 2010/0125424 A1 | 5/2010 | Ding et al. |
| 2014/0343875 A1 | 11/2014 | Spyropoulos et al. |
| 2020/0042021 A1 * | 2/2020 | Somani ................. G01F 1/6847 |
| 2021/0004027 A1 * | 1/2021 | Mudd ..................... H01L 21/67 |

\* cited by examiner

MULTI-CHAMBER RATE-OF-CHANGE SYSTEM FOR GAS FLOW VERIFICATION

CLAIM OF PRIORITY UNDER 35 U.S.C. § 119

The present application for patent claims priority to Provisional Application No. 62/675,529 entitled "Multi-chamber Rate-of-Change System for Wide Range Gas Flow Verification" filed, May 23, 2018, and assigned to the assignee hereof and hereby expressly incorporated by reference herein.

BACKGROUND

Field

The present invention relates to systems and methods for assessing mass flow controllers. In particular, but not by way of limitation, the present invention relates to systems and methods for assessing operational aspects of mass flow controllers.

Background

A typical mass flow controller (MFC) is a device that sets, measures, and controls the flow of a gas. An important part of an MFC is a sensor that measures the mass flow rate of a gas flowing through the device. The MFC compares an output signal of the sensor with a predetermined set point and adjusts a control valve to maintain the mass flow rate of the gas at the predetermined set point.

During development of an MFC, when troubleshooting operation of an MFC, or when validating operation of an MFC, the MFC may be assessed to determine whether the MFC is operating as expected. One type of assessment includes connecting the MFC to a gas supply, and then setting the MFC to a particular setpoint that corresponds to a particular mass flow rate. A separate, mass flow meter (MFM) is used to obtain a measured mass flow rate of the gas to determine whether the measured mass flow rate is the same as the particular mass flow rate (that the MFC is supposed to provide). If the measured mass flow rate differs from the particular mass flow rate (that the setpoint is supposed to provide), then the MFC may be further analyzed to determine why MFC is not operating as expected or as desired.

Although MFMs can provide meaningful flow rate information under many conditions, there are many flow conditions that adversely affect one or more attributes (e.g., noise and/or accuracy) of the measured mass flow rate; thus, new methods are desired to improve the measured mass flow rate signal output from an MFM.

SUMMARY

An aspect may be characterized as a multi-chamber rate-of-change flow meter system that includes a collection of N chambers, means for drawing a gas into or out of the collection of N chambers, N pressure sensors coupled to corresponding chambers, and means for redistributing the gas among the chambers. A measurement module is coupled to the pressure sensors to obtain a rate of change of pressure in each of the chambers due to the redistribution of the gas and calculate a flow rate of the gas flowing into or out of the collection of N chambers based upon the rate of change of pressure in each of the chambers.

Another aspect may be characterized as a method for measuring a flow rate of a gas with multi-chamber rate-of-change flow meter system. The method includes drawing a gas into or out of the collection of N chambers, obtaining readings from N pressure sensors where each of the N pressure sensors is coupled to a corresponding one of the N chambers, and redistributing the gas among the N chambers. Based upon the rate of change of pressure in each of the chambers, a flow rate of the gas flowing into or out of the collection of N chambers is calculated.

DETAILED DESCRIPTION

Figure 1:
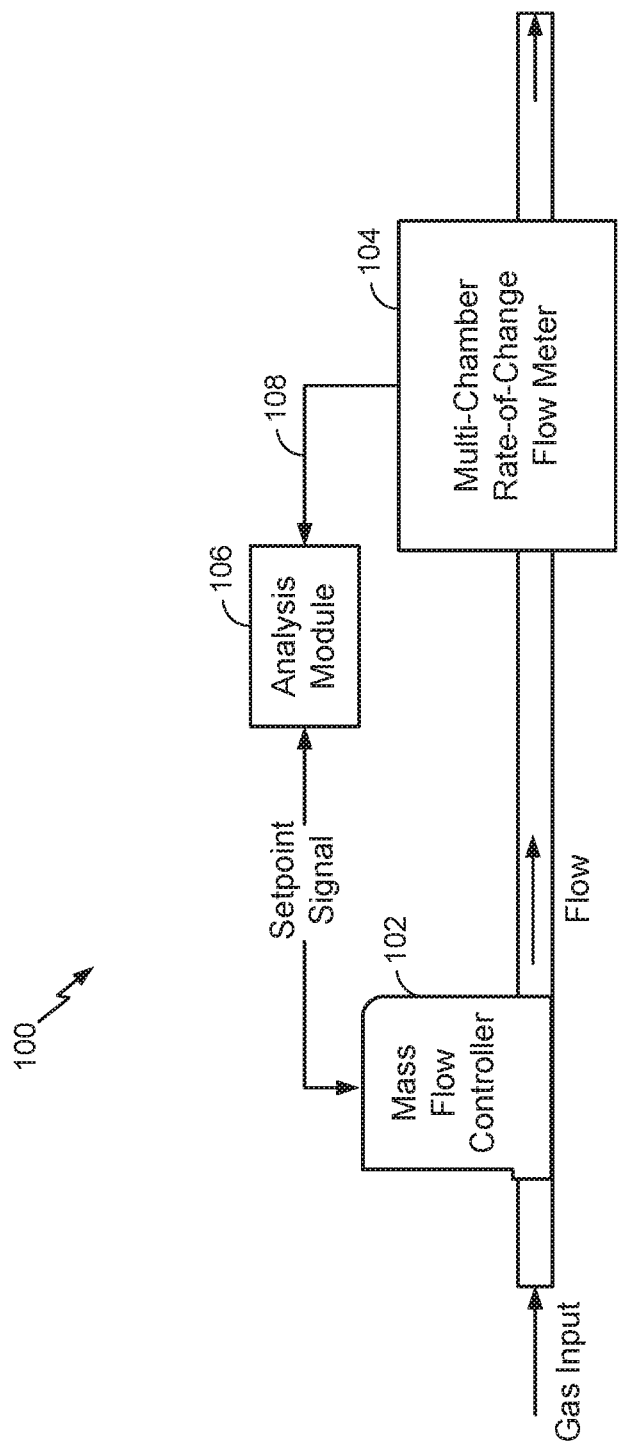
FIG. 1 is a block diagram depicting a mass flow controller (MFC) test system in which embodiments of a multi-chamber rate-of-change flow meter may be implemented.

Referring to FIG. 1, shown is an MFC test system 100 in which an MFC 102 under test is coupled to a multi-chamber rate-of-change flow meter 104. Also shown is a setpoint signal that is provided to the MFC 102 and an analysis module 106. As depicted, the multi-chamber rate-of-change flow meter 104 outputs a measured flow signal 108 indicative of a mass flow rate of a gas that is passing through the MFC 102 and the multi-chamber rate-of-change flow meter 104.

The multi-chamber rate-of-change flow meter 104 is useful for assessing operational aspects of the MFC 102 including: 1) measuring operational characteristics of the MFC 102 under transient changes to a flow rate of a gas moving through the MFC 102; 2) measuring stability of the flow rate as controlled by the MFC 102; and 3) measuring accuracy of the MFC 102. The MFC test system 100 is useful during development of the MFC 102 (e.g., algorithm and structural design development) and for troubleshooting/ verifying operation of the MFC 102. When undergoing testing, the MFC 102 may be operated with its control loop engaged, and the MFC 102 is disposed in the same gas flow path as the multi-chamber rate-of-change flow meter 104, which measures an actual flow rate of the gas. The gas that is input to the MFC 102 may be from any of a variety of gas supply sources (including a pressurized gas-containment vessel).

The MFC test system 100 depicted in FIG. 1 is configured to operate as a rate-of-rise (RoR) type of test system in which a gas flows into the multi-chamber rate-of-change flow meter 104 and a rate of increasing pressure of the gas (described in more detail further herein) is used to produce the measured flow signal 108. But one of ordinary skill in the art, in view of this disclosure, will appreciate that the multi-chamber rate-of-change flow meter 104 may also be operated as a rate-of-decay (RoD) type of test system in which the multi-chamber rate-of-change flow meter 104 is disposed upstream from the MFC 102 and the gas flows out the multi-chamber rate-of-change flow meter 104. When implemented as RoD type of system, a rate of decreasing pressure of the gas is used to produce the measured flow signal 108. For consistency and clarity, embodiments of the multi-chamber rate-of-change flow meter 104 described herein are RoR flow meters, but it should be recognized that these embodiments are exemplary only, and that RoD embodiments will readily be appreciated in view of this disclosure.

The MFC test system 100 may also be adapted to test a mass flow meter by replacing the mass flow controller 102 with the mass flow meter, and a flow sensor signal of the mass flow meter may be provided to the analysis module 106 for comparison with the measured flow signal 108. In this adaptation, the gas flow that is input to the mass flow meter may be provided by a mass flow controller. As discussed further herein, the multi-chamber rate-of-change flow meter 104 improves upon many aspects of single-chamber rate-of-change flow meters. To provide an appreciation of the benefits of the multi-chamber rate-of-change flow meter 104, single chamber approaches are discussed first with reference to FIGS. 10 to 15.

Figure 10:
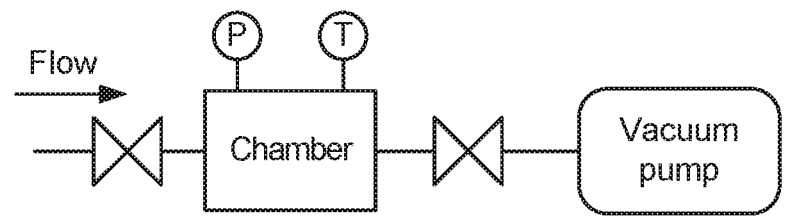
FIG. 10 is a diagram depicting a prior art mass flow meter.
Figure 11:
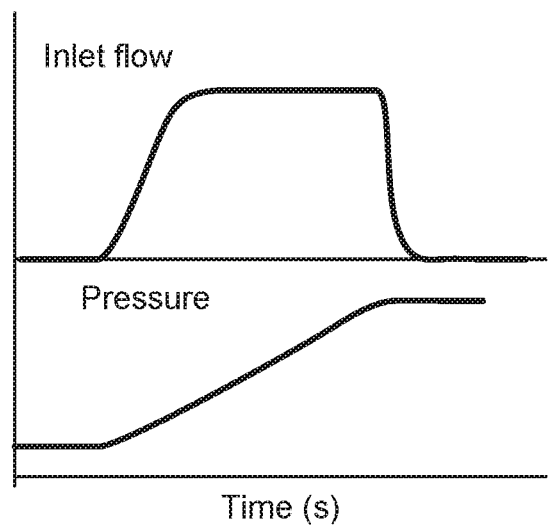
FIG. 11 is a graph of inlet flow and pressure of the mass flow meter of FIG. 10.

One type of test MFM shown in FIG. 10 is a pressure rate-of-rise (RoR) system that consists of a chamber, a pressure sensor, a temperature sensor, an inlet valve and an outlet valve. The outlet valve connects the chamber to a vacuum pump, and after a desired level of vacuum has reached, the outlet valve closes, the inlet valve opens, and a measured flow enters the chamber. An actual (inlet) flow, and pressure in the chamber may look like the flow rate and pressure depicted in FIG. 11.

Figure 12:
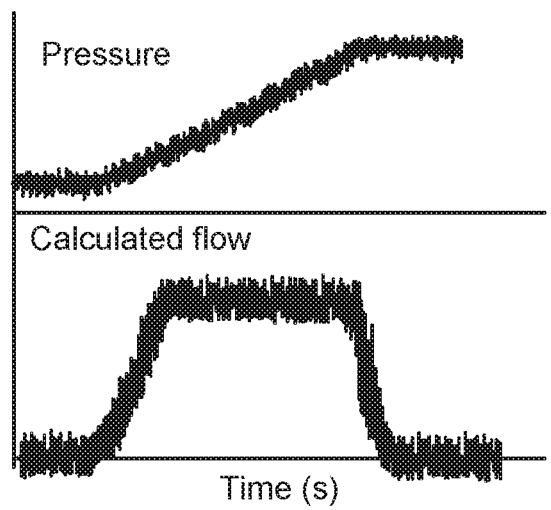
FIG. 12 is a graph of pressure and calculated flow produced with the mass flow meter of FIG. 11.

Pressure and temperature sensors are used to measure gas parameters, and a calculated gas flow is derived from those parameters. According to the ideal gas law, $PV=nRT$, gas flow can be calculated as: $flow=dn/dt=(V/R)*d(P/T)/dt$. For detecting a fast flow deviation, a temperature can be considered constant, and flow is a function of a pressure derivative: $flow=V/(RT)*dP/dt$. Because flow is a derivative of pressure, a high frequency pressure sensor noise will be amplified, which may produce a significant amount of noise in the calculated flow signal as shown in FIG. 12.

Figure 13:
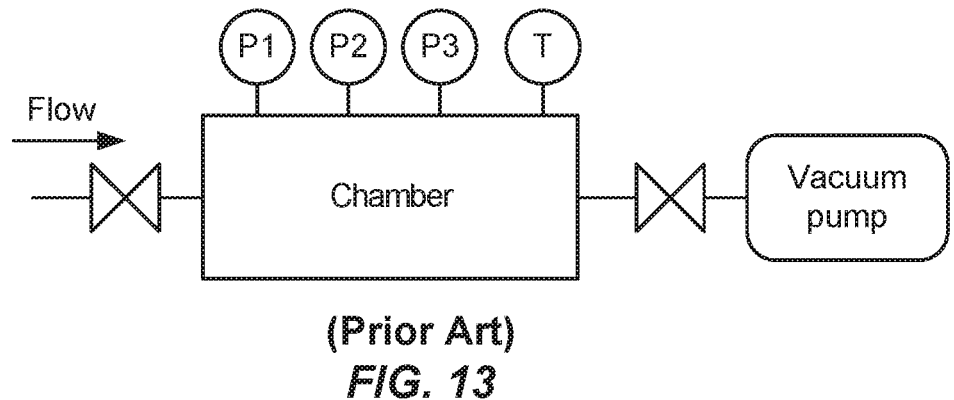
FIG. 13 depicts another prior art mass flow meter.
Figure 14:
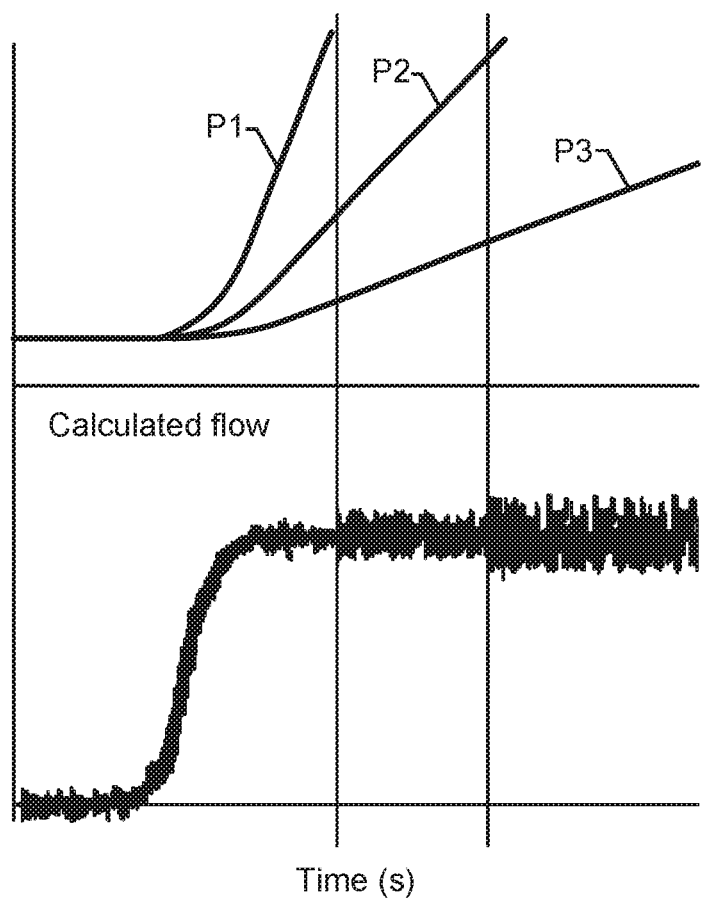
FIG. 14 is a graph depicting pressure values and calculated flow values produced from the embodiment depicted in FIG. 13.

For accuracy measurements, the noise can be filtered over a long period of time. But the filtering does not allow detection of small and fast flow deviations, caused, for instance, by a pressure disturbance on the input of the MFC 102, or abnormal operation of MFC 102 control loop. Better results can be achieved by using several pressure sensors with different pressure measurement ranges as shown in FIG. 13. First, data from a most sensitive pressure sensor P1 is used, and then data acquisition may be switched to a less sensitive pressure sensor P2 as pressure in the chamber rises. Since the absolute value of noise of a more sensitive pressure sensor is typically lower, a noise of a derived flow may also be lower at the beginning of the process, and the noise will increase while less sensitive pressure sensors P2, P3 are being used as shown in FIG. 14.

Figure 15:
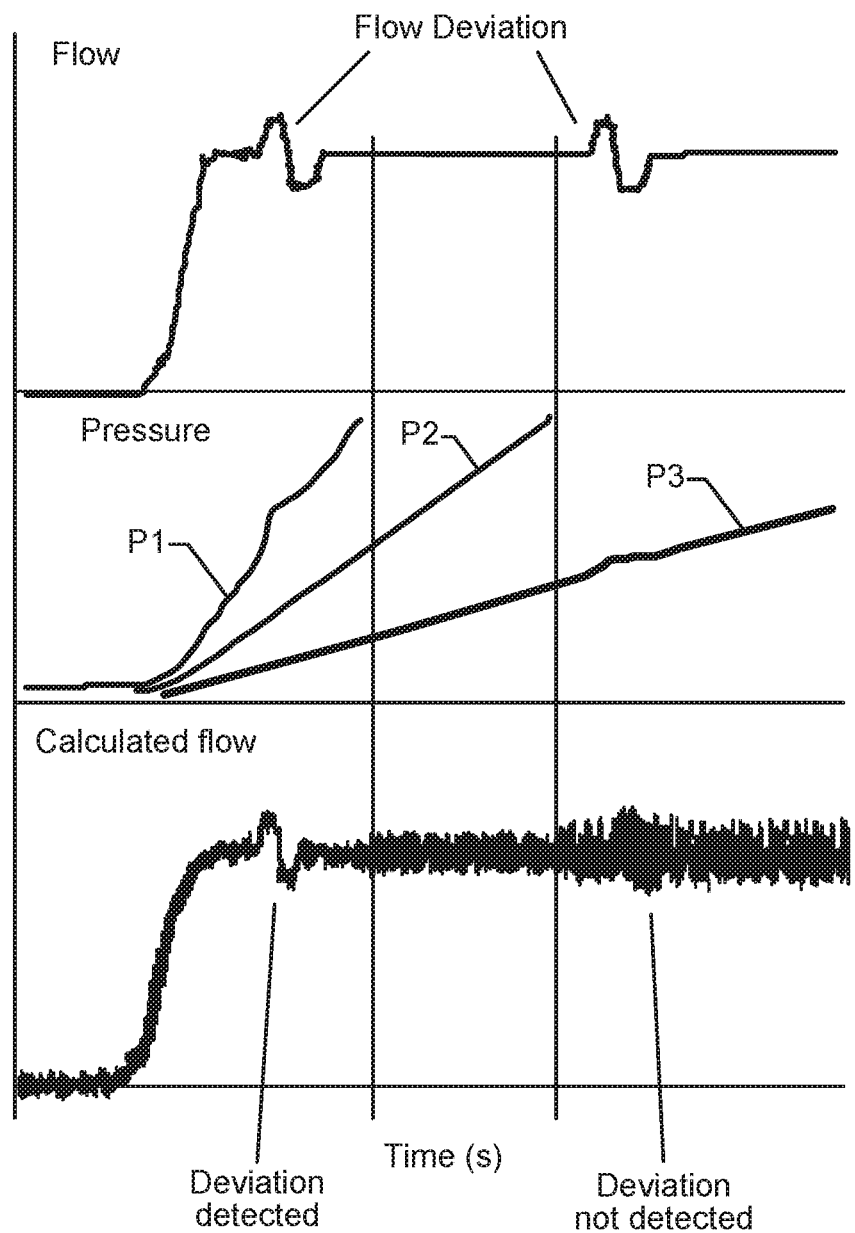
FIG. 15 is another graph depicting pressure values and calculated flow values produced from the embodiment depicted in FIG. 13.

This approach allows detection of small flow deviations only at the beginning of the test process, when the most sensitive pressure sensors are used. After some time, when a less sensitive pressure sensor is used, the derived flow will be very noisy, and small flow deviation could not be detected as shown in FIG. 15.

This method to operate the system depicted in FIG. 13 also requires very accurate characterization of aspects (e.g., sensitivity and non-linearity) of pressure sensors to avoid discontinuities of calculated flow at switching points from one pressure sensor to another pressure sensor.

Referring again to FIG. 1, Applicant has found that further modifications may be made by employing a number of additional chambers to arrive at the multi-chamber rate-of-change flow meter 104. In general, the multi-chamber rate-of-change flow meter 104 includes N chambers where N is greater than or equal to two.

Figure 2A:
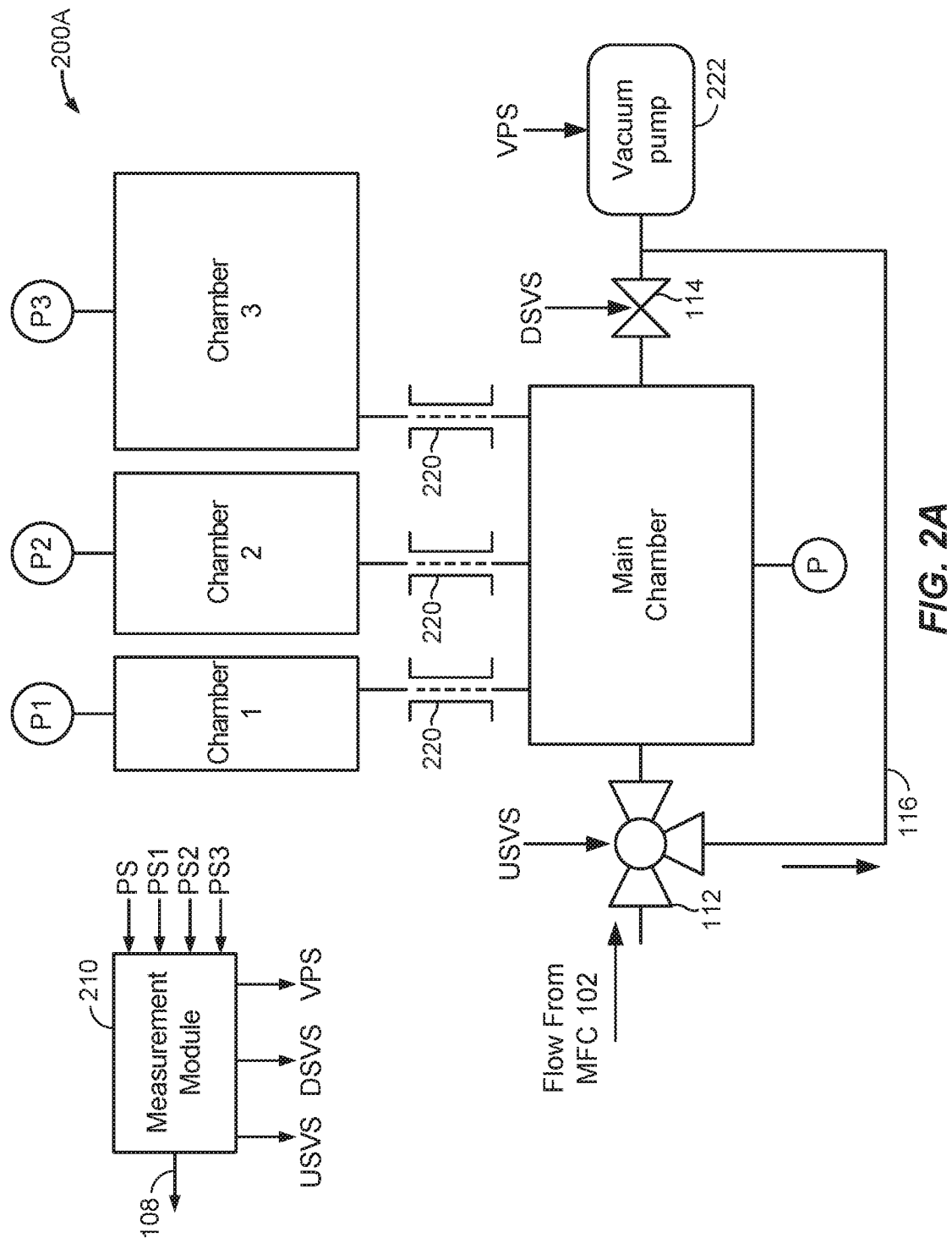
FIG. 2A is a diagram depicting an exemplary embodiment of the multi-chamber rate-of-change flow meter of FIG. 1.

Referring to FIG. 2A, for example, shown is an embodiment 200A of the multi-chamber rate-of-change flow meter 104 that includes four chambers: a main chamber, and three additional chambers (chamber 1, chamber 2, and chamber 3), wherein each of the additional chambers is coupled to the main chamber via a corresponding one of three flow restrictors 220. The main chamber is coupled to a pressure sensor P, and each of the additional chambers is coupled to a corresponding one of three pressure sensors: P1, P2, and P3. On an upstream side of the main chamber is an upstream valve 112 and on a downstream side of the main chamber is a downstream valve 114 and coupled to the downstream valve 114 is a vacuum pump 222.

Also shown is a measurement module 210 that is coupled to each of the pressure sensors P, P1, P2, P3 via signal lines (not shown) to receive pressure signals PS, PS1, PS2, PS3 from the main chamber, chamber 1, chamber 2, and chamber 3, respectively. The measurement module 210 is also coupled to the upstream valve 112, the downstream valve 114, and the vacuum pump 222 via signal lines (not shown) to provide an upstream valve signal USVS, a downstream valve signal DSVS, and a vacuum pump signal VPS, respectively. In many implementations, each of the upstream valve signal USVS, the downstream valve signal DSVS, and the vacuum pump signal VPS may be electrical control signals (e.g., direct current voltages).

For example, as one of ordinary skill in the art will appreciate, the upstream valve 112 and the downstream valve 114 may be configured to be closed with a high voltage and opened with a low voltage (e.g., a zero (0) voltage), and the vacuum pump 222 may be turned on with a high voltage and turned off with a low voltage. It is also contemplated that in other implementations, one or more of the upstream valve 112, the downstream valve 114, and the vacuum pump 222 may be configured to operate with a proportional response across a range of voltages. In these other implementations, one or more of the upstream valve signal USVS, the downstream valve signal DSVS, and the vacuum pump signal VPS may vary across a range of voltages depending upon a desired setting of the upstream valve 112, the downstream valve 114, and/or the vacuum pump 222. It is also contemplated that pneumatic control signals may utilized instead of electrical control signals.

Although not required, the upstream valve 112 may be implemented as a three-way valve (as shown in FIG. 2A) that is disposed to receive the flow from the MFC 102, and the upstream valve 112 has one output that is coupled to the main chamber and another output that is coupled to the vacuum pump 222 via a diversion duct 116. The upstream valve 112 is capable of: 1) closing completely so gas neither flows into the main chamber nor flows through the diversion duct 116; 2) opening to the diversion duct 116 while closing the path to the main chamber; and 3) opening the path to the main chamber while closing the path to the diversion duct 116. Alternatively, a separate diversion valve may couple the flow to the diversion duct 116, and in these implementations, the diversion valve may be opened while the upstream valve 112 is closed. These valve configurations may enable at least three test modes discussed below.

In addition, each of the chambers may include a temperature sensor (not shown) that is disposed to obtain a temperature of the gas that flows into the corresponding chamber. The temperature signal from each of the temperature sensors is provided to the measurement module 210 by connections that are not depicted in the drawings for clarity. Also not shown are signal lines from the pressure sensors that connect to the measurement module 210. And connections between the measurement module 210 and the upstream valve 112, the downstream valve 114 and the vacuum pump 222 are also not shown for clarity.

In many implementations, each of the chambers has a different volume, but in some implementations the main chamber has the same volume of one of chamber 1, chamber 2, or chamber 3. It is also possible to implement the embodiment 200A of FIG. 2 with one of chamber 1, chamber 2, or chamber 3 having the same volume as one or more of chamber 1, chamber 2, and chamber 3. Each of the pressure sensors, P1, P2, and P3 may be implemented with the same pressure range or different pressure ranges. The flow restrictors 220 may be implemented by a variety of different types of restrictors. A function of the flow restrictors 220 is to smooth or damp a response so flow into chamber 1, chamber 2, or chamber 3 will not respond as much to a pressure change in the main chamber. More specifically, the flow from the main chamber to other chambers is limited by the flow restrictors 220, which results in the smoothing or damping. Thus, the pressure in chamber 1, chamber 2, and chamber 3 will not fluctuate as much as the pressure in the main chamber due to the changes in flow.

Although operational aspects of the embodiment 200A vary (as discussed below in more detail) depending upon a test mode that is employed, in all test modes carried out by the embodiment 200A, the downstream valve 114 is opened, and the vacuum pump 222 is connected to evacuate gas from all the chambers. It has been found that when evacuating the gas from the chambers, that it is beneficial to evacuate the gas from the chambers until a threshold pressure in the chambers is reached without dropping the pressure in the chambers below the threshold pressure. Specifically, it has been found that, in some instances, the flow restrictors 220 operate more reliably when the pressure in the chambers stays above the threshold pressure. For example, the threshold pressure may be 100 Torr (about 13.3 kPa), or the threshold pressure may be 10 Torr (about 1.3 kPa), but these threshold pressures are only exemplary and other threshold pressures may be used depending upon the particular types of restrictors 220 that are used.

In a variation of the embodiment 200A, each of the additional chambers (chamber 1, chamber 2, and chamber 3) may include an evacuation port that is coupled to the vacuum pump 222 via a corresponding downstream valve 114. During the test modes, instead of opening and closing the single downstream valve 114 (as shown in FIG. 2A and described above), all of the downstream valves 114 are opened and closed at the same time. This type of configuration provides fast evacuation of the gas from all of the chambers, especially high-volume chambers, because the gas does not have to be drawn through the flow restrictors 220 to evacuate the additional chambers (chamber 1, chamber 2, and chamber 3).

In addition, in all test modes carried out by the embodiment 200A, after the gas is evacuated from the chambers, the downstream valve 114 is closed, and the upstream valve 112 is positioned to enable the gas to flow only into the main chamber and not the diversion duct 116. When the gas flow starts, the gas enters the main chamber, which causes pressure to rise in the main chamber. At that moment, a rate of rise of the pressure is defined mostly by a volume of the main chamber. While pressure in the main chamber is rising, the gas starts flowing into the additional chambers through the flow restrictors 220. The rate of pressure change in the main chamber will slow down, and gas pressure in all other chambers will rise according to their volumes and restriction properties of the flow restrictors 220. While gas is flowing into the chambers, the pressure and temperature in each of the chambers may be different. When the flow is stopped (e.g., when the MFC 102 closes or the inlet valve is closed), the pressure and temperature will equalize after some time.

In a first test mode, while the downstream valve 114 is open to evacuate the gas from the chambers, the upstream valve 112 is initially completely closed so gas flows neither into the main chamber nor into the diversion duct 116. While the upstream valve 112 is completely closed, the MFC 102 is set to a zero-flow setpoint to close a valve within the MFC 102. Then, the downstream valve 114 is closed and the upstream valve 112 is positioned to enable gas to flow only into the main chamber (and not the diversion duct 116) as described above. Then, the setpoint of the MFC 102 is changed from the zero-flow setpoint to a non-zero setpoint, and gas will flow through the MFC 102 into the chamber.

In a second test mode, while the downstream valve 114 is open to evacuate the gas from the chambers, the upstream valve 112 is positioned to allow gas to flow through the diversion duct 116 and not into the main chamber. Then the MFC 102 is set to a non-zero setpoint so gas will flow through the MFC 102 and into the diversion duct 116. Then, the downstream valve 114 is closed and the upstream valve 112 is positioned to enable gas to continue to flow through the MFC 102, but the gas will flow only into the main chamber (and not the diversion duct 116). Thus, this second test mode enables testing of the MFC 102 when the MFC 102 has already been providing a stabilized flow. In this second test mode, while gas is flowing through the MFC 102 into the main chamber, the setpoint of the MFC 102 may be changed to another setpoint to test operation of the MFC 102 from one non-zero setpoint to another setpoint.

In a third test mode, while the downstream valve 114 is open to evacuate the gas from the chambers, the MFC 102 is given a non-zero setpoint and the upstream valve 112 is positioned to allow gas to flow into the collection of N chambers at a first flow rate while the open downstream valve 114 enables the gas to be drawn out of the collection of the N chambers at a second flow rate that exceeds the first flow rate to create a lower pressure in the N chambers than exists outside of the N chambers.

When the threshold pressure is reached, the downstream valve 114 is closed (thus, ceasing the draw of the gas out of the collection of the N chambers) and the upstream valve 112 is positioned to enable gas to continue to flow through the MFC 102, through the upstream valve 112, and into the main chamber. Similar to the second test mode, this third test mode enables testing of the MFC 102 when the MFC 102 has already been providing a stabilized flow, and while gas is flowing through the MFC 102 into the main chamber, the setpoint of the MFC 102 may be changed to another setpoint to test operation of the MFC 102 from one non-zero setpoint to another setpoint.

But the third test mode may only reliably work with a low enough flow rate through the MFC 102, which allows the vacuum pump 222 to achieve the threshold pressure in the chambers while gas is flowing through the MFC 102 into the chambers at the same time. If the flow through the MFC 102 is too high (so the threshold pressure in the chambers is not reached) a predefined time interval can be used instead. If a predefined time has elapsed, the downstream valve 114 is closed, and the test process continues in a similar way to other test modes, even if pressure in the chambers is still higher than the threshold pressure. Of course, the pressure in the chambers should satisfy requirements of proper system operation, performance, and accuracy.

It is contemplated that there are many potential variations to the embodiment 200A depicted in FIG. 2A. For example, in a simplified variation of the embodiment 200A, the diversion path is omitted and the upstream valve 112 is realized by a simple two-way valve. Using this simplified variation, the first and third test modes described above may be carried out, but the second test mode requires the diversion of the gas around the chambers; thus, the simplified variation is not suited for the second test mode.

One of ordinary skill in the art will appreciate that because the downstream valve 114 is closed during testing, the pressure in the main chamber will reach a test pressure threshold where testing of the MFC 102 can no longer be effectively carried out. Thus, the measurement module 210 may be configured to stop the test when the pressure in the main chamber reaches the test pressure threshold. The particular value of the test pressure threshold may depend upon several factors including: an operating range of the pressure sensors P, P1, P2, P3; a pressure at which the gas no longer behaves like an ideal gas; and an ability of the MFC 102 to operate properly with a high outlet pressure.

Figure 2B:
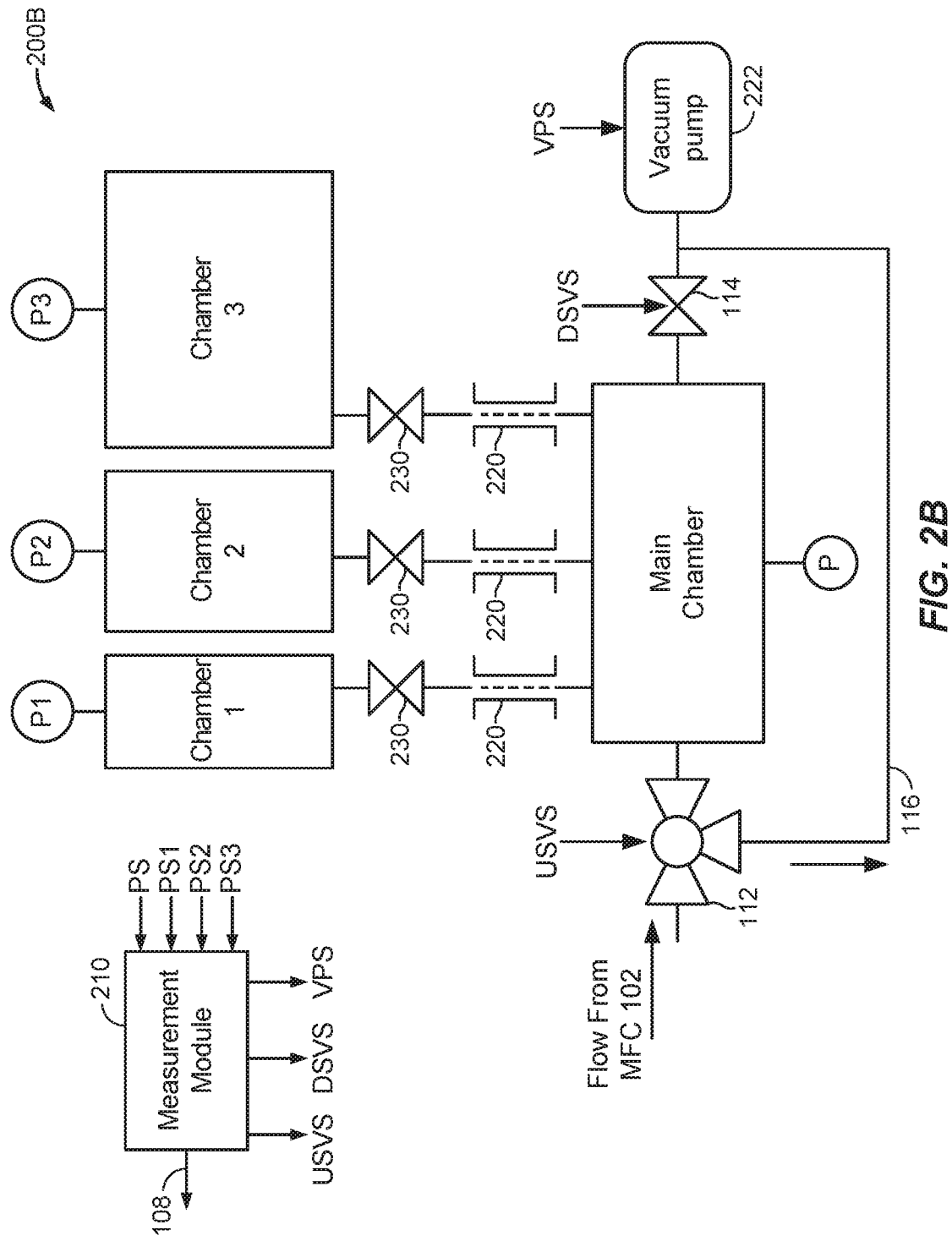
FIG. 2B is a diagram depicting another exemplary embodiment of the multi-chamber rate-of-change flow meter of FIG. 1.

Referring next to FIG. 2B, shown is an embodiment 200B that is a variation of the embodiment 200A. As shown, the embodiment 200B depicted in FIG. 2B is substantially the same the embodiment 200A in FIG. 2A except that shutoff valves 230 (e.g., electrically controllable shutoff valves) are utilized in series with the flow restrictors 220 to couple the main chamber to the additional chambers. Although not shown for clarity, the measurement module 210 may be coupled to each shutoff valve 230 by a signal line to provide a control signals to the shutoff valves 230. In this embodiment 200B, one or more of the shutoff valves 230 may be closed to change the system configuration. This capability enables the configuration to be selected based upon the flow range of the MFC 102 that is being tested. Thus, the embodiment 200B in FIG. 2B provides additional flexibility relative to the embodiment 200A of FIG. 2A. But the embodiment 200A in FIG. 2A is still a viable approach to testing an MFC 102 in a specific, non-varying, range of flows.

In a variation of the embodiment depicted in FIG. 2B, the flow restrictors 220 are not included, and when open, the shutoff valves 230 may effectuate a flow restriction by virtue of a restrictive nature of the flow path within each shutoff valve 230.

Figure 3:
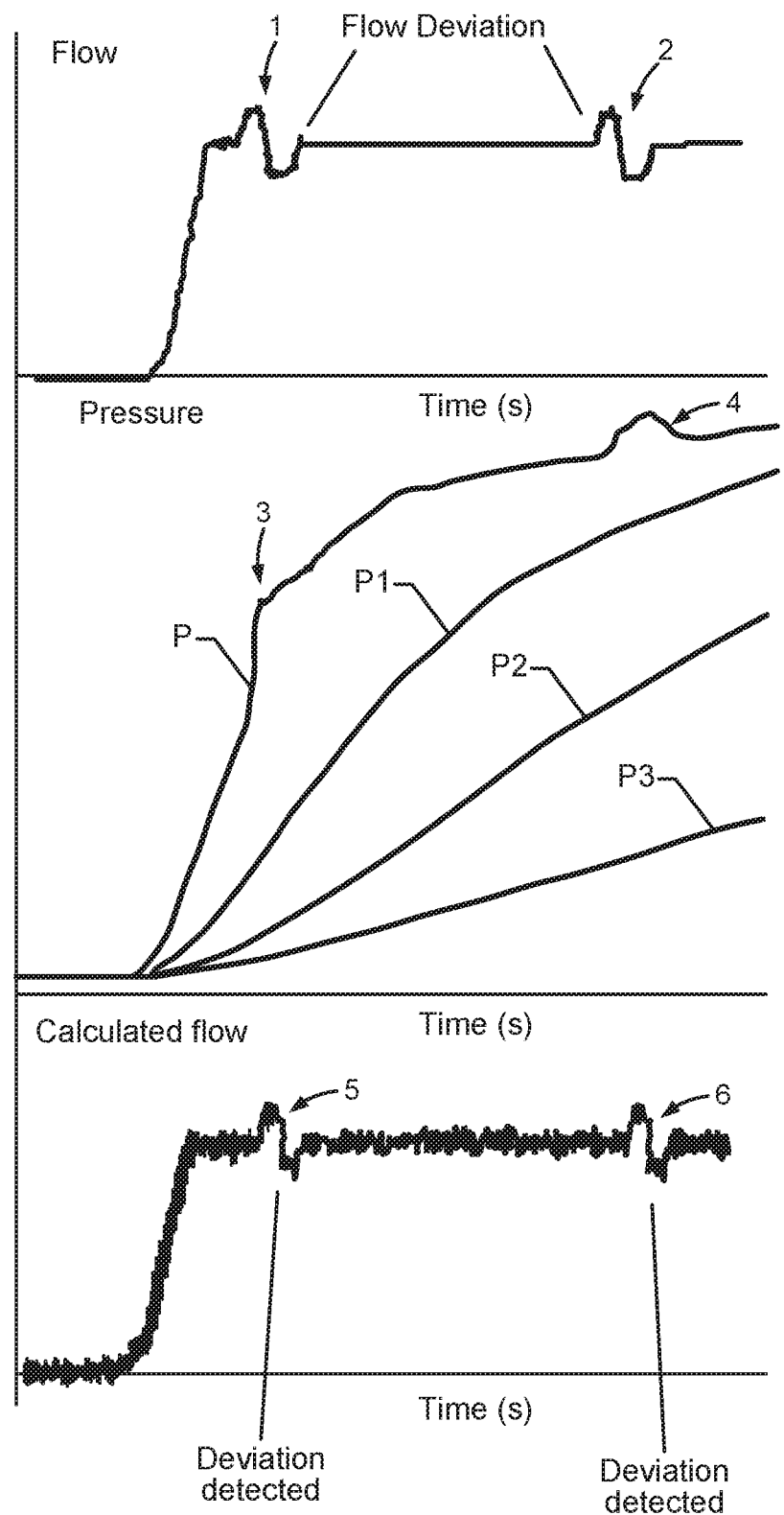
FIG. 3 includes three graphs depicting operation of the embodiments of the multi-chamber rate-of-change flow meters in FIGS. 2A and 2B.

Referring to FIG. 3, shown are three graphs depicting operation of the embodiments 200A and 200B shown in FIGS. 2A and 2B. Shown in FIG. 3 are (along different timelines): 1) flow; 2) pressure measurements from pressure sensors P, P1, P2, and P3; and 3) calculated flow (as calculated from the pressure measurements). As shown, if a fast deviation of the flow occurs (shown at Point 1), a pressure (as indicated by pressure measurement from pressure sensor P) in the main chamber will be affected first (shown at Point 3), producing a change in the rate-of-rise of the pressure as if only the main chamber is present. Because the volume of the main chamber is smaller than the total volume of the chambers, the effect of the fast flow deviations on the pressure in the main chamber will be much more pronounced, and deviations of flow rate can be detected more reliably than in a single chamber design.

An estimated improvement of fast flow deviation detection is approximately equal to the ratio of the total volume of all chambers to the volume of the main chamber. And it is beneficial that this improvement will take effect regardless of the time when the flow deviation occurred. As shown, in FIG. 3, a later flow deviation (shown at Point 2) is also perceptibly sensed by the pressure sensor, P, (at Point 4) during the second, later flow deviation. This aspect of the embodiments 200A and 200B stands in contrast to the design depicted in FIG. 10 and its operation depicted in FIG. 12.

Because the flow into the additional chambers (chamber 1, chamber 2, and chamber 3) is restricted, there will be a limited rate of rise of pressure in those chambers. Due to that limited pressure rise in each of the additional chambers, the pressure sensor signals can be appropriately filtered, reducing high frequency noise, and as a result, calculated flow is less noisy (as shown in FIG. 3 at Points 5 and 6 in contrast to FIG. 15). A total amount of a gas in the system at each moment may be calculated using readings from all pressure and temperature sensors and a known volume of each chambers. As a result, there will be no discontinuities in the calculated flow.

Figure 4:
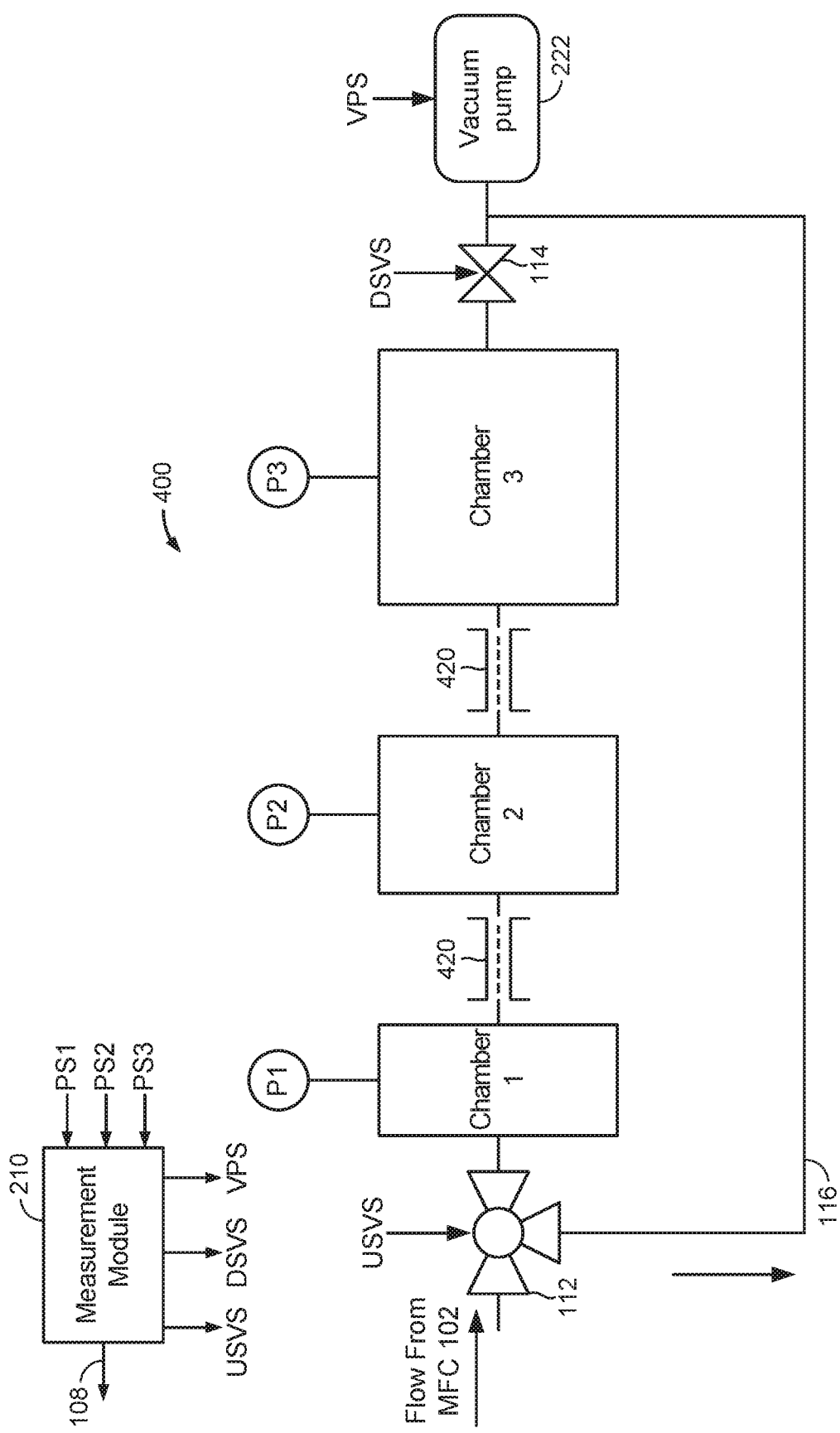
FIG. 4 is a diagram depicting yet another exemplary embodiment of the multi-chamber rate-of-change flow meter of FIG. 1.

Referring next to FIG. 4, shown is another embodiment 400 of the multi-chamber rate-of-change flow meter 104 where multiple chambers are connected in series. As depicted, a chamber volume may increase in size with a smallest chamber (chamber 1) being disposed closest to the upstream valve 112 (connected to the MFC 102 under test) and the largest chamber (chamber 3) being closest to the vacuum pump 222 downstream. But in some implementations, one or more of chamber 1, chamber 2, and chamber 3 may have the same volume.

In operation, the upstream valve 112 is initially closed, the downstream valve 114 is opened, and the vacuum pump 222 is utilized to evacuate gas from all chambers. Then, the downstream valve 114 is closed and the upstream valve 112 is opened, which prompts gas to flow first into chamber 1 (the smallest chamber), producing a rise of pressure in chamber 1. At that moment, a rate of rise of the pressure is defined mostly by the volume of chamber 1. While pressure is rising in chamber 1, the gas starts flowing into chamber 2 through a flow restrictor 420. The rate of pressure change in chamber 1 will decrease, and gas pressure in chamber 2 will rise according to its volume and restriction properties of the flow restrictor 420 between chamber 1 and chamber 2.

Figure 5:
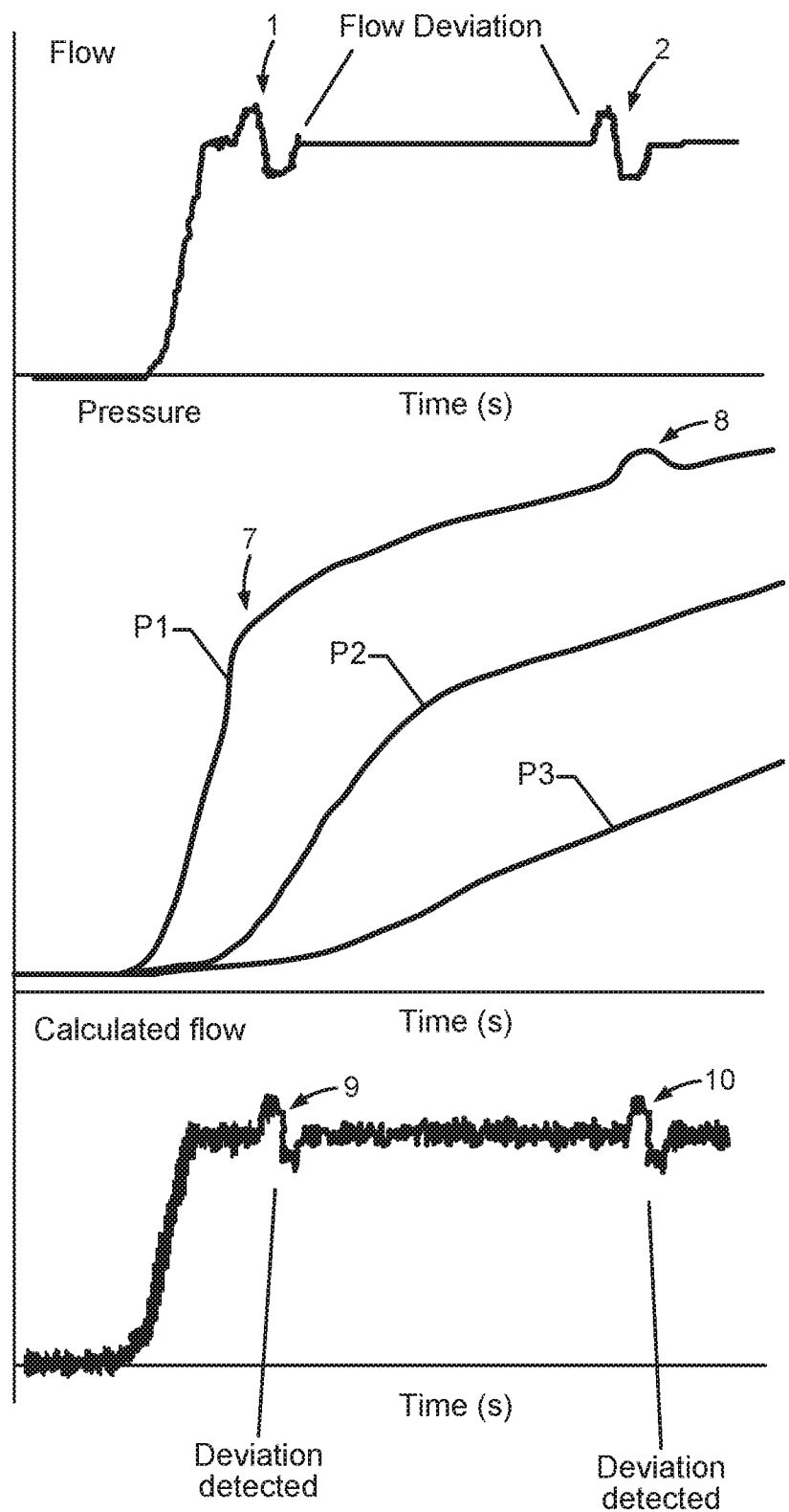
FIG. 5 includes three graphs depicting operation of the embodiment of the multi-chamber rate-of-change flow meter in FIG. 4.

A similar process repeats for all other N−1 chambers in the system. Due to restrictions between each of the chambers created by the flow restrictors 420, a meaningful pressure rise in every next, downstream, chamber will start later. If fast deviations of the steady-state flow occur at Points 1 and 2, a pressure in chamber 1 will be affected the most, producing a pressure rate-of-rise change (as shown in FIG. 5 at Points 7 and 8), as if only chamber 1 is present. Because the volume of chamber 1 is smaller than the total volume of all of the chambers, the effect of the fast flow deviations on the pressure in chamber 1 will be much more pronounced in the measured pressure of P1, and hence, variations in flow can be detected (at Points 9 and 10) more reliably than single chamber designs. When the flow of gas stops, all the chambers will first have a different pressure and temperature, which will equalize after some time. The embodiment 400 may be operated according to the three test modes discussed above with reference to FIG. 2A.

A total amount of a gas in the system at each moment may be calculated using readings from all pressure and temperature sensors and a known volume of each of the chambers. As a result, there will be no discontinuities in the calculated flow.

In connection with the embodiments of FIGS. 2 and 4, the flow restrictors 220, 420 are an important part of both embodiments. The construction of the flow restrictors 220, 420 define how the pressure is redistributed between chambers, and as a result, how accurately flow deviations can be measured. The flow restrictors 220, 420 may be realized, for example without limitation, by following types of a restrictive elements: laminar flow elements (LFE); simple orifice types; critical flow nozzles; and shutoff valves.

The flow restrictors 220, 420 may be fixed, or adjustable. If adjustable, the flow restrictors 220, 420 may be manually adjustable or electromechanically adjustable. If implemented as electromechanically adjustable restrictors, the flow restrictors 220, 420 may be set to a non-varying position during testing, or the flow restrictors 220, 402 may be dynamically adjusted during operation (e.g., based on measured system parameters and a specified algorithm).

Figure 6:
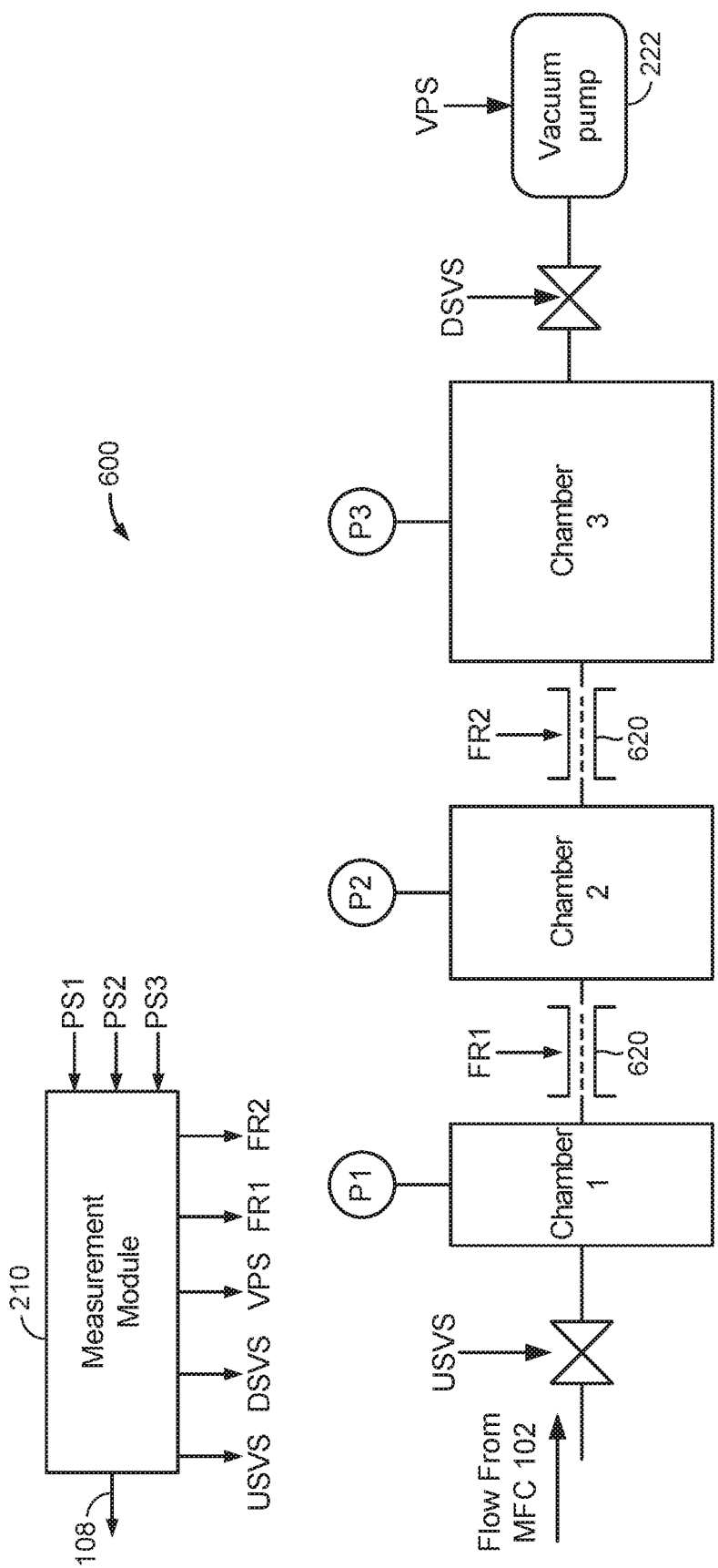
FIG. 6 is a diagram depicting an additional exemplary embodiment of the multi-chamber rate-of-change flow meter of FIG. 1.

Referring next to FIG. 6, shown is an embodiment 600 of the multi-chamber rate-of-change flow meter 104 that includes an exemplary control mechanism that regulates restriction between chambers based on the pressure in an upstream chamber (a chamber located closer to the gas inlet). As shown, the measurement module 210 in this embodiment 600 is configured to provide flow restrictor signals FR1, FR2 to the flow restrictors 620.

Figure 7:
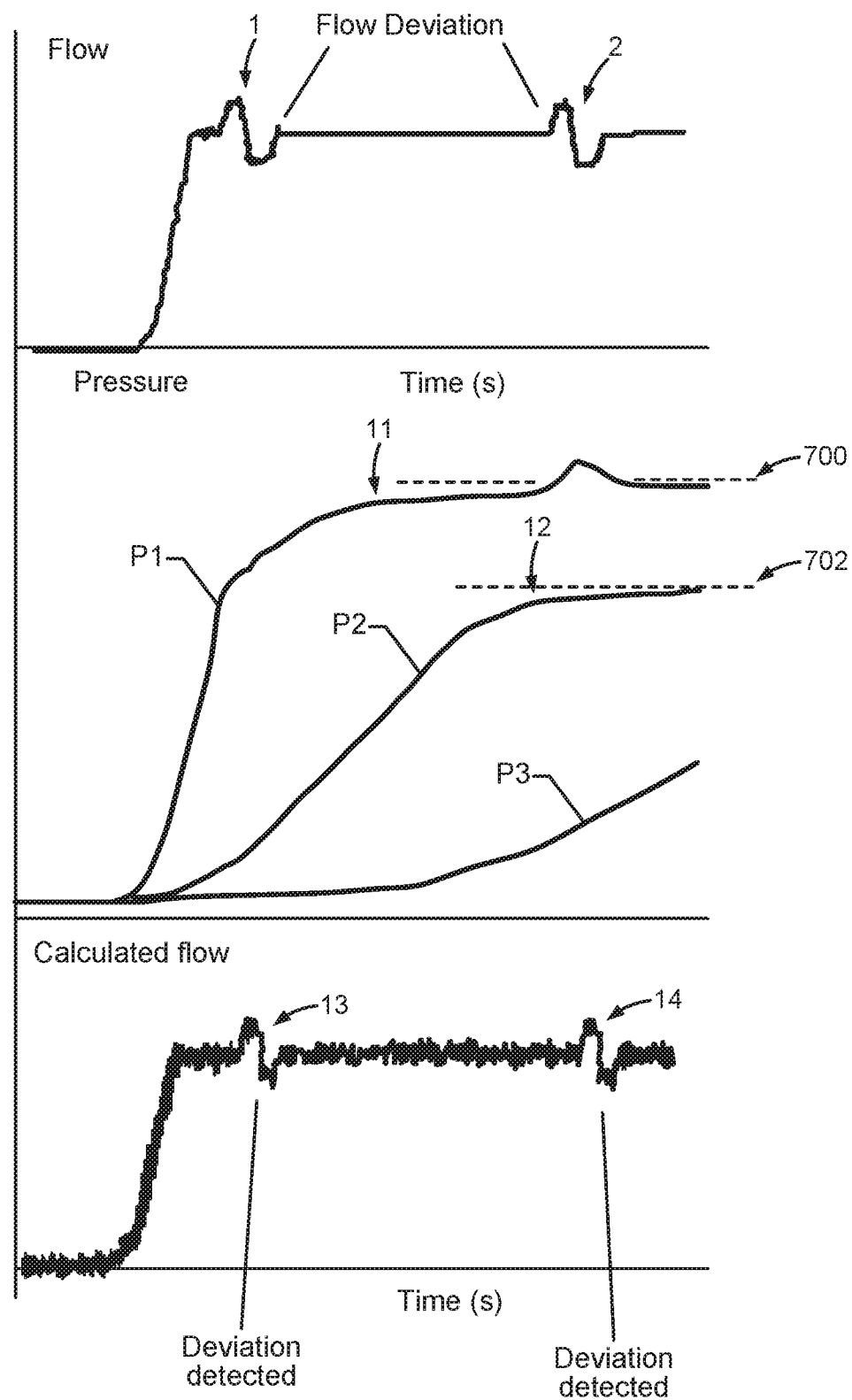
FIG. 7 includes three graphs depicting operation of the embodiment of the multi-chamber rate-of-change flow meter in FIG. 6.

While referring to FIG. 6, simultaneous reference to made to FIG. 7, which depicts graphs of an exemplary flow, corresponding pressure measurements, and a flow calculated from the pressure measurements. As shown in FIG. 7, while pressure in chamber 1 is approaching a predefined value 700 at around Point 11, the flow restrictor 620 between chamber 1 and chamber 2 is opened more; thus, letting more gas move from chamber 1 to chamber 2 so the pressure in chamber 1 may reach and then stay close to (e.g., slightly above or slightly below) the predefined value 700 during a test. This will prevent the upstream chamber from having too high of a pressure in the event of high inlet flow. As shown in FIG. 7, while a gas is flowing through the chambers, one or more other upstream chambers (e.g., chamber 2) may also reach a corresponding predefined pressure level (e.g., level 702 at about Point 12), and all the gas thereafter will accumulate in downstream chambers (e.g., chamber 3) with a higher volume.

Figure 8:
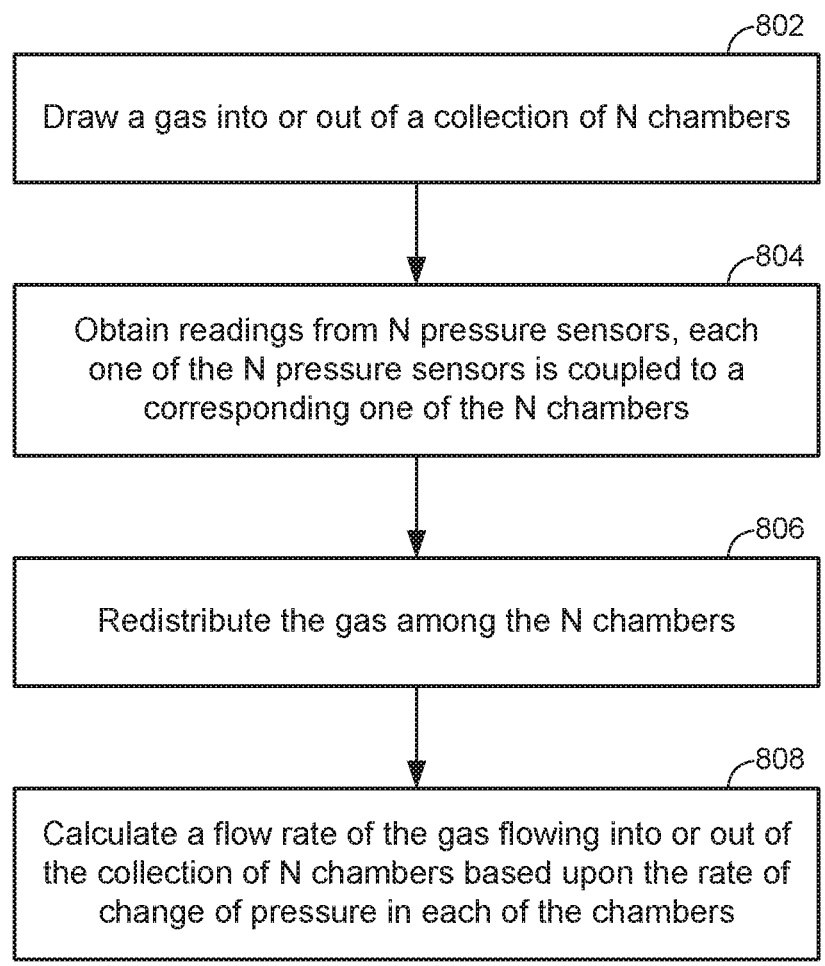
FIG. 8 is a flowchart depicting a method that may be traversed in connection with embodiments disclosed herein.

Referring next to FIG. 8, shown is a flowchart depicting a method that may be carried out in connection with the embodiments disclosed herein. As shown, a gas is drawn into or out of a collection of N chambers (Block 802). As discussed above, the multi-chamber rate-of-change flow meter systems disclosed herein may operate as rate-of-rise type systems or rate-of-decay type systems. In the context of a rate-of-decay-type system, the chambers may be pressurized with the gas, and then the downstream valve 114 may be opened to draw the gas out of the chambers. For example, the measurement module 210 may open the upstream valve, close the downstream valve, and pressurize the collection of N chambers with the gas pressurizer. Then the downstream valve is opened, and the upstream valve is closed to draw the gas out of the collection of N chambers. The gas pressurizer may be a pressurized gas containment vessel that feeds gas to the upstream valve. In the context of a rate-of-rise type system, the measurement module 210 may close the upstream valve 112, open the downstream valve 114, and evacuate the N chambers with the vacuum pump 222. The downstream valve is then closed, and the upstream valve is opened to draw the gas into the collection of N chambers.

As shown, readings are obtained from N pressure sensors wherein each one of the N pressure sensors is coupled to a corresponding one of the N chambers (Block 804), and the gas is redistributed among the N chambers (Block 806). The present disclosure details several means for redistributing the gas among the N chambers. At a high level, the multi-chamber rate-of-change flow meter systems include flow restrictions between connected chambers that define how pressure is redistributed, and hence, define how the gas is redistributed among the chambers. As discussed above, the restrictions may include flow restrictors 220, 420 and shutoff valves 230. In addition, the arrangement of the N chambers also defines how the gas is redistributed among the chambers. For example, the embodiments discussed above with reference to FIGS. 2A and 2B result in a different progression (in terms of how the gas redistributes among the N chambers) than the embodiments discussed above with reference to FIGS. 4 and 6. Thus, the arrangement and configuration of the N chambers in connection with the restrictions effectuate the redistribution of gas among the N chambers (Block 806).

A flow rate of the gas flowing into or out of the collection of N chambers is calculated based upon the rate of change of pressure of each of the chambers (Block 808). According to the ideal gas law, $PV=nRT$, gas flow can be calculated as: $flow=dn/dt=(V/R)*d(P/T)/dt$. If a high level of accuracy is not required, temperature may be considered constant, and flow may be calculated (e.g., to detect a fast flow deviation) as a function of a pressure derivative: $flow=V/(RT)*dP/dt$. A total flow into or out of the multi-chamber rate-of-change flow meter 104 is equal to the sum of gas flows to each of the N chambers. It should be noted that the flow to one or more of the N chambers may be a negative value while the gas is redistributing among the chambers.

Figure 9:
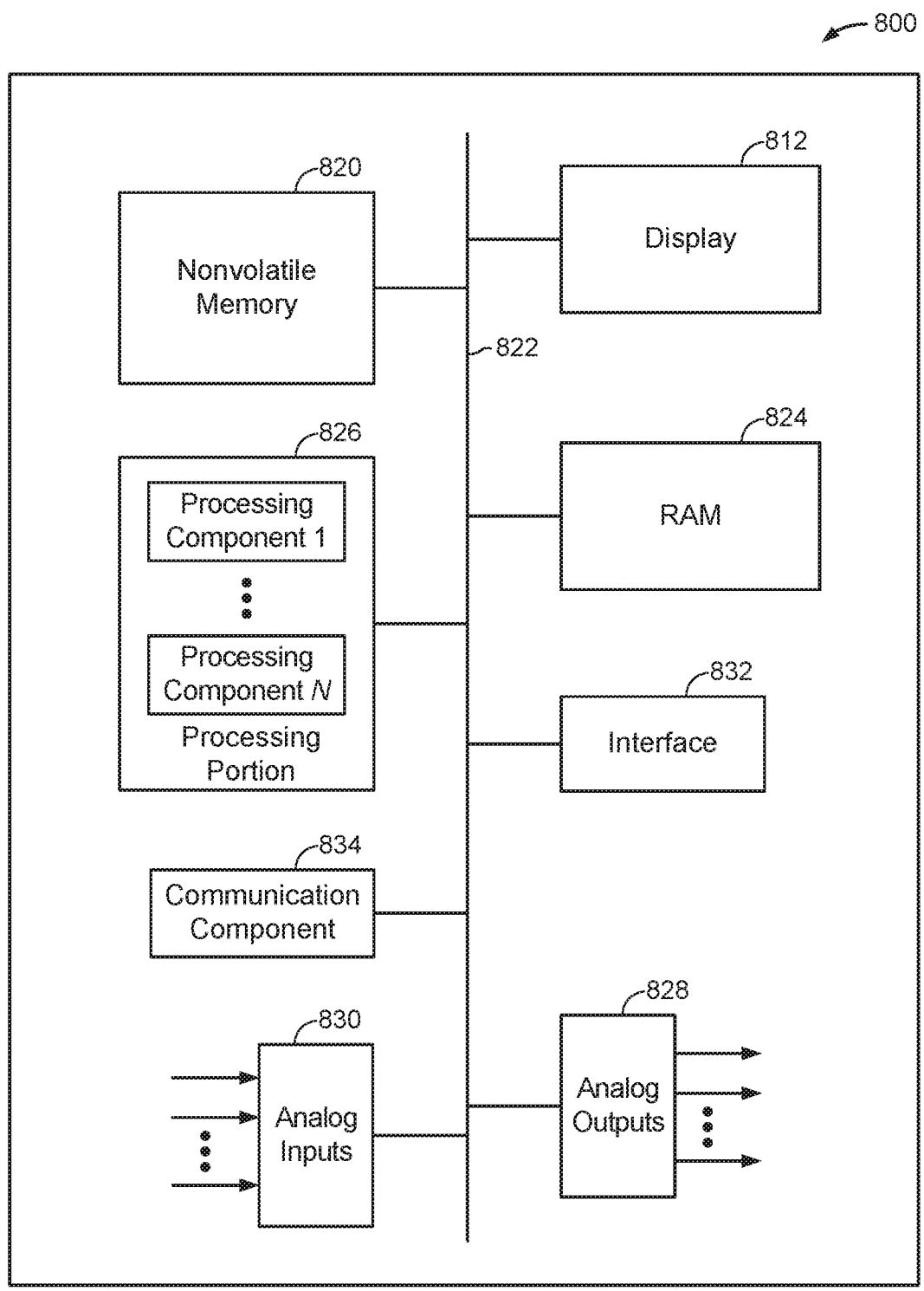
FIG. 9 is a block diagram of an exemplary computing system.

Referring next to FIG. 9, shown is a block diagram of a computing system 800 depicting physical components that may be utilized to realize aspects of components and systems described herein that perform logical operations to effectuate algorithms. For example, the analysis module 106 and the measurement module 210 may by realized (at least in part) by the computing system 800 along with processor executable instructions.

As shown, a display 812, and nonvolatile memory 820 are coupled to a bus 822 that is also coupled to random access memory ("RAM") 824, a processing portion (which includes N processing components) 826, a collection of analog outputs 828, and a collection of analog inputs 830. Although the components depicted in FIG. 9 represent physical components, it should be recognized that the depicted computing system may be replicated and distributed.

This display 812 generally operates to provide a presentation of content to a user, and in several implementations, the display is realized by an LCD or OLED display. In general, the nonvolatile memory 820 functions to store (e.g., persistently store) data and processor executable code including non-transitory processor-executable code that is associated with the functional components described herein. In some embodiments for example, the nonvolatile memory 820 includes bootloader code, software, operating system code, file system code, and code to facilitate the methods described herein.

In many implementations, the nonvolatile memory 820 is realized by flash memory (e.g., NAND or ONENAND™ memory), but it is certainly contemplated that other memory types may be utilized as well. Although it may be possible to execute the code from the nonvolatile memory 820, the executable code in the nonvolatile memory 820 is typically loaded into RAM 824 and executed by one or more of the N processing components in the processing portion 826.

The N processing components in connection with RAM 824 generally operate to execute the instructions stored in nonvolatile memory 820 to effectuate the functional components and methods described herein (e.g., the method described with reference to FIG. 8). For example, the analysis module 106, measurement module 210, and any other logical aspects of the multi-chamber rate-of-change flow meter 104 and mass flow controller 102 may be realized by one or more of the N processing components in connection with non-transitory processor-readable code that is executed from RAM 824.

The interface 832 generally represents one or more components that enable a user to interact with the MFC test system 100. The interface 832, for example, may include a keypad, touch screen, and one or more analog or digital controls, and the interface 832 may be used to translate an input from a user into the setpoint signal (which may be output from the analog outputs 828). And the communication component 834 generally enables the MFC test system 100 to communicate with external networks and devices. One of ordinary skill in the art will appreciate that the communication component 834 may include components (e.g., that are integrated or distributed) to enable a variety of wireless (e.g., WiFi) and wired (e.g., Ethernet) communications.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. For example, embodiments may include different variations of multiple chambers disposed in series, parallel, and series-parallel topologies. Thus, the present invention is not intended to be limited to the embodiments shown herein but is to be accorded the widest scope consistent with the principles and novel features disclosed herein.

In conclusion, the present invention provides, among other things, a system and method for assessing mass flow controllers and mass flow meters. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention.

What is claimed is:

1. A multi-chamber rate-of-change flow meter system, the system comprising:
   a collection of N chambers;
   means for drawing a gas into or out of the collection of N chambers;
   at least one temperature sensor to measure temperature of the gas;
   N pressure sensors, each one of the N pressure sensors is coupled to a corresponding one of the N chambers;
   means for redistributing the gas among the chambers, the means for redistributing the gas among the chambers includes a plurality of flow restrictors; and
   a measurement module coupled to the pressure sensors to obtain a rate of change of pressure in each of the chambers due to the redistribution of the gas and calculate a sum of gas flows into or out of each of the N chambers to obtain a flow rate of the gas flowing into or out of the collection of N chambers based upon the temperature and the rate of change of pressure in each of the chambers.

2. The multi-chamber rate-of-change flow meter system of claim 1, wherein the means for drawing a gas into or out of the collection of N chambers includes:
   an upstream valve;
   a downstream valve;
   a vacuum pump; and
   the measurement module is configured to:
      close the upstream valve, open the downstream valve, and evacuate the N chambers with the vacuum pump; and
      close the downstream valve and open the upstream valve to draw the gas into the collection of N chambers.

3. The multi-chamber rate-of-change flow meter system of claim 2, including:
   a diversion duct coupled between an inlet of the collection of N chambers and an outlet of the collection of N chambers via a diversion valve;
   wherein the measurement module is configured to:
      open the diversion valve while the upstream valve is closed to allow gas to flow through the diversion duct to create a non-zero flow before the downstream is closed; and
      close the diversion valve in connection with the opening the upstream valve to draw the gas into the collection of N chambers.

4. The multi-chamber rate-of-change flow meter system of claim 3, wherein the diversion valve and the upstream valve are integrated into a three-way valve.

5. The multi-chamber rate-of-change flow meter system of claim 1, wherein the means for drawing a gas into or out of the collection of N chambers includes:
   an upstream valve;
   a downstream valve;
   a vacuum pump; and the measurement module configured to:
open the upstream valve to draw the gas into the collection of N chambers at a first flow rate, open the downstream valve to draw the gas out of the collection of N chambers at a second flow rate that exceeds the first flow rate to evacuate the N chambers with the vacuum pump; and
close the downstream valve to draw the gas into the collection of N chambers.

6. The multi-chamber rate-of-change flow meter system of claim 1, wherein the at least one temperature sensor comprises
N temperature sensors, each one of the N temperature sensors is coupled to a corresponding one of the N chambers; and
wherein the measurement module is coupled to the temperature sensors to obtain a temperature of each of the N chambers and calculate a flow rate of the gas flowing into or out of the collection of N chambers based upon the rate of change of pressure in each of the chambers and the temperature of each of the N chambers.

7. The multi-chamber rate-of-change flow meter system of claim 1, wherein the means for redistributing the gas among the chambers includes conduit between each chamber and one other chamber.

8. The multi-chamber rate-of-change flow meter system of claim 1, wherein the means for drawing a gas into or out of the collection of N chambers includes:
an upstream valve;
a downstream valve;
a gas pressurizer; and
the measurement module configured to:
open the upstream valve, close the downstream valve, and pressurize the collection of N chambers with the gas pressurizer; and
open the downstream valve and close the upstream valve to draw the gas out of the collection of N chambers.

9. A method for measuring a flow rate of a gas with a mulit-chamber rate-of-change flow meter system, the method comprising:
drawing a gas into or out of the collection of N chambers;
obtaining readings from N pressure sensors, each one of the N pressure sensors is coupled to a corresponding one of the N chambers;
obtaining a measure of a temperature of the gas;
restricting, without stopping, gas flow between chambers via a plurality of flow restrictors, to redistribute the gas among the N chambers; and
calculating a sum of gas flows into or out of each of the N chambers to obtain a flow rate of the gas flowing into or out of the collection of N chambers based upon the temperature and the rate of change of pressure in each of the chambers.

10. The method of claim 9, wherein drawing the gas into or out of the collection of N chambers includes:
evacuating the N chambers; and
opening an upstream valve to draw the gas into the collection of N chambers.

11. The method of claim 10, including diverting gas around the collection of N chambers to create a non-zero flow before drawing a gas into or out of the collection of N chambers.

12. The method of claim 9, wherein drawing the gas into or out of the collection of the N chambers includes:
drawing the gas into the collection of N chambers at a first flow rate while drawing the gas out of the collection of the N chambers at a second flow rate that exceeds the first flow rate to create a lower pressure in the N chambers than exists outside of the N chambers; and
ceasing to draw gas out of the collection of the N chambers when the lower pressure reaches a threshold.

* * * * *